2,941,597
SECONDARY RECOVERY

Leo J. O'Brien, Crystal Lake, Ill., assignor to The Pure Oil Company, Chicago, Ill., a corporation of Ohio No Drawing. Filed June 8, 1959, Ser. No. 818,512

4 Claims. (Cl. 166—42)

This invention relates to a method for injecting water into oil-producing reservoirs made up of two or more vertically-adjacent strata of different permeabilities which contain hydratable clay that swells upon contact with water.

It is conventional practice in the producing of partially depleted oil fields to practice secondary recovery by injecting water or brine into the reservoir under pressure in order to force the oil toward one or more producing wells. Frequently, the petroleum reservoir is made up of vertically-adjacent, oil-containing strata of different permeabilities. If an attempt is made to inject water into the formation, the water will tend to penetrate through the formation of greatest permeability with the result that the flood is ineffective to drive oil from the less permeable stratum.

The oil-bearing strata contain various amounts of hydratable clays, such as montmorillonite. Contact of such clay-containing formations with water low in salts content causes hydration of the clay, concomitant swelling, and reduction in the permeability of the formation. This swelling effect is greatest in the case of montmorillonite and least in the case of kaolinite. Illite is intermediate between montmorillonite and kaolinite in its swelling propensity.

Whereas fresh or non-saline water causes swelling of clay and reduction of permeability of clay-containing formations, brine produces no substantial swelling of the clay, and as a result it can be passed through clay-containing formations without reducing the permeability. This difference in effect of fresh and saline water is utilized in accordance with my invention to reduce the more permeable formation to a permeability substantially equal to that of the less permeable formation so that the formation can be flooded in an effective manner.

It is an object of this invention to recover residual oil from subterranean petroleum reservoirs by water-flooding. It is another object of this invention to provide a method for uniformly injecting water into subterranean formations of different permeabilities. A still further object of the invention is to provide a method for recovering larger amounts of residual oil from petroleum reservoirs having strata of different permeabilities. Other objects of the invention will become manifest from the following description.

In accordance with my invention, where the formation in which secondary recovery by water-flooding is to be carried out is composed of two or more vertically-adjacent strata of different permeabilities, and contains clay such as montmorillonite, which swells upon hydration, the formations are isolated from each other within a bore-hole penetrating said formation by a packer set in the annulus between the casing and the tubing at the interface between the two strata.

After the adjacent strata have been isolated from each other by packing, fresh water is pumped under about 500 pounds pressure through said annulus into the more permeable formation, and brine (containing more than 1000 parts per million of salts) is pumped at the same pressure through the tubing into the less permeable stratum. When the injection rate, per square foot of well face, into the upper stratum has been decreased to the point where it is equal to the injection rate into the lower stratum, as indicated by metering the two streams of water pumped into the tubing and annulus, the injection of fresh water is terminated, and brine is thereafter injected into both zones at the same rate and at the same pressure.

As used in the specification and claims, the term "fresh water" means water containing less than about 1000 parts per million of dissolved salts. Although the term "brine" as used herein means any water containing more than 1000 parts per million of sodium chloride and/or other dissolved salts, to insure against swelling, brine containing more than 1%, and preferably at least 5% by weight, of sodium chloride or equivalent should be used.

The reduction in permeability of the stratum containing montmorillonite clay upon contact with fresh water is gradual and does not reach its maximum reduction until the stratum has been contacted with several pore volumes of water. This reduction in permeability is not reversed by subsequent contact of the formation with brine, and the reduction in permeability is substantially uniform over the total extent of the formation contacted with the fresh water.

The salinity of solution required to prevent reduction in permeability of a particular formation and the amount of fresh water required to be injected into the more permeable stratum in order to reduce its permeability to substantially that of the stratum of lesser permeability can be determined by treatment of core samples of the formations in the laboratory. The following table demonstrates the effect of water salinity on the permeability of a core having an initial permeability of 45 millidarcies.

Table I

| Water salinity (wt. percent NaCl): | Core permeability (md.) |
|---|---|
| 1 | 14 |
| 5 | 40 |
| 10 | 43 |
| 15 | 44 |

The permeability shown in the foregoing table is the final, constant permeability attained after passing several pore volumes of the brine through a core containing montmorillonite clay.

It will be seen from the results in Table I that the 1% sodium chloride solution caused some reduction in permeability whereas the brines containing 5, 10 and 15% caused substantially no reduction in permeability.

The following Table II shows the effect of distilled water on a water-sensitive core having an initial permeability of 100 millidarcies.

Table II

| Pore volumes of distilled water: | Permeability (md.) |
|---|---|
| 0 | 100 |
| 1 | 35 |
| 2 | 10 |
| 3 | 2.5 |
| 6 | 1.8 |

These data were obtained in experiments on synthetic cores prepared by mixing together 86% sand, 12% Lucite, and 2% montmorillonite, and heating the mixture while subjected to pressure in a mold until the mass was bonded together into a unitary structure, without melting the Lucite. The cores were saturated with oil and brine, and then flooded to residual oil and water with 10% by weight sodium chloride solution before testing with distilled water. It will be seen from Table II that the permeability of the core was reduced from 100 millidarcies to 1.8 millidarcies.

As a specific example of the invention, a petroleum formation having an upper stratum containing about 2% by weight of montmorillonite clay and a permeability of 100 millidarcies, and a lower adjacent stratum also containing about 2% of montmorillonite clay, but having a permeability of only 15 millidarcies, is packed off to permit injection of fresh water into the upper stratum and concurrent injection of brine into the lower stratum.

In preparing to initiate the method of this invention, a well bore penetrating both strata is cased, the casing is cemented and then perforated at both strata, a string of tubing is run to about one foot from the bottom of the hole, and a packer is set in the annulus between the casing and tubing at the interface between the two strata. Then injection is started, pumping fresh water through the annulus and into the upper more permeable stratum, and pumping brine, preferably containing more than about 5% of dissolved salts, through the tubing and into the lower, less permeable stratum. Both waters are pumped at a pressure of about 500 p.s.i.g. It is desirable that substantially the same pressure be applied to both strata, and that the injection pressure applied to the less permeable stratum be not greater than the pressure applied to the more permeable stratum. The amount of fresh water entering the more permeable stratum and the amount of brine entering the less permeable stratum are proportional to the thickness and permeability of each stratum when the injection pressures are substantially equal. Thus, with the two zones being of equal thickness and the injection pressures equal, the water acceptance rates of the strata are in proportion to their respective permeabilities.

But as the fresh water contacts the hydratable clays present in the more permeable stratum, the permeability of the stratum gradually diminishes, and it is necessary to reduce the injection rate in order to maintain the injection pressure constant. When the injection rate, per square foot of well face, into the upper stratum has been decreased to the point where it is equal to the injection rate into the lower stratum, as indicated by metering the two streams of water pumped into the tubing and annulus, the injection of fresh water is terminated, and brine is thereafter injected into both zones at the same rate and at the same pressure. It is apparent that the permeabilities of the two strata must be substantially equal in the zone immediately surrounding the injection well when the injection, or water-intake, rates have been made substantially equal at a given injection pressure.

The water-intake rates of the two strata are observed periodically while injecting salt water into both strata, and any inequalities which develop are corrected by switching to fresh water until they become equal again. Consequently, it is preferred to leave the packer in position permanently. However, where it is necessary to remove the packer for any reason after the initial treatment with fresh water has been completed, the water-intake profile may be determined periodically by conventional spinner tests, and correction of inequalities made as necessary by reinstalling the packer and again injecting fresh water until the intake rates again become equal.

If the flow pattern within the more permeable stratum were completely linear, the entire stratum would be contacted with about the same amount of water, because the fresh water would pass through the stratum as a uniform bank ahead of the brine which is injected subsequently. This, according to the information presented in this specification, would result in the attainment of substantially uniform permeability throughout the stratum, and would represent the ultimate benefit to be gained by practicing the invention. However, few, if any, flood patterns are completely linear. Usually, radial flow patterns are also formed to varying degrees, even in so-called "line drives." Consequently, the bank of fresh water gradually becomes thinner as it expands radially away from the injection well, with the result that part of the stratum is not contacted with as much water as the zone immediately surrounding the injection well. The permeability of this zone is not decreased sufficiently to equal the permeability of the lower, less permeable zone, but it is decreased by a substantial amount, even by contact with the relatively small volume of fresh water. This reduction in the ratio between the permeabilities of the vertically-adjacent strata results in substantial improvement in flood efficiency and oil recovery, even though it falls short of the maximum possible benefit which would be realized if the permeabilities of the strata were rendered equal throughout.

It is to be noted that this process substantially decreases the tendency for flood water to migrate from the less permeable stratum into the more permeable stratum, despite the usual failure to attain exactly equal permeabilities. During the initial phase of the operation, while fresh water and brine are being pumped at the same pressure into the more permeable and less permeable strata, respectively, the more permeable stratum accepts a greater volume of water in a given time. Consequently, the flood front advances more rapidly in the more permeable stratum than in the less permeable stratum, with the result that the permeability of the upper stratum is made more nearly equal to that of the lower stratum by the time the advancing brine front reaches any particular point. This, of course, reduces the extent to which oil in the tighter stratum is bypassed by floodwater flowing into the looser stratum, and contributes greatly to the improved flooding efficiency.

Whereas prior methods which have attempted to equalize the flow of water through strata of different permeabilities by partially plugging the pores of the looser or more permeable zone have succeeded in equalizing permeabilities only for a short distance from the injection well, with the result that the brine or water channels into the more permeable zone and by-passes the remainder of the tighter or less permeable zone, my method is effective in reducing the permeability of the looser or more permeable zone throughout its entire extent, with the result that the floodwater passes more uniformly through all strata of the producing reservoir.

This application is a continuation in part of application Serial No. 741,013, filed June 10, 1958, now abandoned.

What is claimed is:

1. The method of flooding petroleum-containing reservoirs having at least two vertically-adjacent strata of different permeabilities traversed by a bore-hole, said strata containing hydratable clay in sufficient quantity to cause reduction in permeability upon contact with fresh water, comprising packing off said strata from each other along said bore-hole by means of suitable packer, simultaneously injecting at substantially equal pressures fresh water into the more permeable stratum, and brine into the less permeable stratum, continuing said injections until the acceptance rates of said strata become about equal, and then discontinuing injection of fresh water and injecting brine into both strata.

2. A method in accordance with claim 1 in which the packers are removed after injection of fresh water is discontinued and before injecting brine into both strata.

3. A method in accordance with claim 1 in which said more permeable formation contains montmorillonite clay.

4. A method in accordance with claim 2 in which the fresh water contains less than about 1000 parts per million of dissolved salts and the brine contains not less than about 5% of dissolved salts.

References Cited in the file of this patent

UNITED STATES PATENTS

| | | |
|---|---|---|
| 2,272,673 | Kennedy | Feb. 10, 1942 |
| 2,800,184 | Meadors | Feb. 9, 1953 |
| 2,837,163 | Ramos et al. | June 3, 1958 |
| 2,839,466 | Shock et al. | June 17, 1958 |